United States Patent [19]

Nishikiori

[11] Patent Number: 5,767,587
[45] Date of Patent: Jun. 16, 1998

[54] DISTRIBUTOR FOR ELECTRIC AUTOMOBILES

[75] Inventor: Hidetaka Nishikiori, Hamamatsu, Japan

[73] Assignee: Suzuki Motor Corporation, Shizuoka-ken, Japan

[21] Appl. No.: 717,997

[22] Filed: Sep. 26, 1996

[30] Foreign Application Priority Data

May 12, 1995 [JP] Japan ................................. 7-344469

[51] Int. Cl.$^6$ ................................................. G06F 17/00
[52] U.S. Cl. .................. 307/9.1; 307/10.1; 180/65.1; 701/36
[58] Field of Search ............................. 307/9.1, 10.1, 307/10.7, 11, 31, 38, 112, 113, 115, 125, 126, 139, 140, 146; 340/825, 825.18; 364/423.098, 424.045; 180/65.1, 65.3, 65.8

[56] References Cited

U.S. PATENT DOCUMENTS

| | | | |
|---|---|---|---|
| 3,070,704 | 12/1962 | Larson et al. | 307/10.1 |
| 4,218,717 | 8/1980 | Shuster | 361/79 |
| 4,578,591 | 3/1986 | Floyd et al. | 307/38 |
| 5,156,232 | 10/1992 | Muroya et al. | 180/273 |
| 5,510,658 | 4/1996 | Nakayama | 307/10.1 |
| 5,608,271 | 3/1997 | Saka et al. | 307/10.1 |
| 5,619,107 | 4/1997 | Shinohara et al. | 318/139 |

*Primary Examiner*—William M. Shoop, Jr.
*Assistant Examiner*—Peter Ganjian
*Attorney, Agent, or Firm*—Bell Seltzer Intellectual Property Law Group Alston & Bird LLP

[57] ABSTRACT

There is provided a distributor of an electric automobile in which the number of switch devices and opening and closing devices is reduced without a sacrifice of functions to thereby simplify and make small a structure. The distributor 10 includes contacts 12P and 12N for cutting off or connecting a driving circuit 68D of an air conditioner 68 and a DC-to-DC converter 66 from or to a main battery 64, electromagnetic coils 12RP and 12RN for opening and closing the contacts 12P and 12N, and a control terminal 12C for controlling the electromagnetic coils 12RP and 12RN.

3 Claims, 4 Drawing Sheets

DISTRIBUTOR FOR ELECTRIC AUTOMOBILES

BACKGROUND OF THE INVENTION

1. Field Of The Invention

The present invention relates to an electric automobile which uses electric power of a main battery to rotate an electric motor for driving the electric automobile, and more particularly to a power distributor for supplying the electric power of the main battery to different devices, such as the drive motor and a DC-to-DC converter.

2. Description Of The Related Art

FIG. 3 is a circuit diagram showing a conventional distributor of an electric automobile, and FIG. 4 is a block diagram showing a peripheral electric circuit of the conventional distributor. A conventional example is now described with reference to the drawings.

The conventional distributor 60 includes contacts 62P and 62N for cutting off or connecting a driving circuit 62D for a drive motor 62 from or to a main battery 64, contacts 66P and 66N for cutting off or connecting a DC-to-DC converter 66 from or to the main battery 64, contacts 68P and 68N for cutting off or connecting a driving circuit 68D for an air conditioner 68 from or to the main battery 64, contacts 70P and 70N for cutting off or connecting the driving circuit 62D for the drive motor 68 from or to the main battery 64 through a resistor 70Pr for controlling the pre-charging, an electromagnetic coil 62R for opening and closing the contacts 62P and 62N for the motor 62, electromagnetic coils 66RP and 66RN for opening and closing the contacts 66P and 66N, electromagnetic coils 68RP and 68RN for opening and closing the contacts 68P and 68N, electromagnetic coils 70RP and 70RN for opening and closing the contacts 70P and 70N, a control terminal 62C used to control the electromagnetic coil 62R, a control terminal 66C used to control the electromagnetic coils 66RP and 66RN for the converter 66, a control terminal 68C used to control the electromagnetic coils 68RP and 68RN for the air conditioner 68, and a control terminal 70C used to control the electromagnetic coils 70RP and 70RN for pre-charging.

Further, the distributor 60 includes input terminals 72IP and 72IN used to charge the main battery 64 by a charger 72, output terminals 62OP and 62ON used to supply electric power of the main battery 64 to the driving circuit 62D, output terminals 66OP and 66ON used to supply electric power of the main battery 64 to the DC-to-DC converter 66, output terminals 68OP and 68ON used to supply electric power of the main battery 64 to the driving circuit 68D, main power input terminals 64IP and 64IN used to supply electric power of the main battery 64 to the distributor, a control terminal 72C used to supply electric power of the charger 72 to the DC-to-DC converter 66, an auxiliary power input terminal 74I and a ground terminal 74E used to supply electric power of an auxiliary battery 74 to the distributor, an auxiliary power output terminal 74O used to supply electric power of the auxiliary battery 74 to external apparatuses, a contact 74P used to supply electric power of the auxiliary battery through the input terminal 74I to the electromagnetic coils 66RP, 66RN, 68RN, 68RP, 70RN and 70RP, and an electromagnetic coil 74R for opening and closing the contact 74P and which coil 74R is controlled through the control terminals 66C and 72C. Diodes 66d2 and 72d2 for prevention of reverse current are connected between the electromagnetic coil 74R and the control terminals 66C and 72C.

The contacts 62P and 62N and the electromagnetic coil 62R are those used for a large current and called a contactor.

Accordingly, the electromagnetic coil 62R is driven by a relay 62R2 connected in series thereto. The electromagnetic coils 66RN, 66RP, 68RN, 70RN and 70RP are connected to flywheel diodes 66d, 68d and 70d, driving transistors 66t, 68t and 70t, and base resistor 66r, 68r and 70r. The control terminal 66C is connected to a start switch 76. The control terminals 72C, 62C, 70C and 68C, the charger 72 and the driving circuit 62D and 68D are connected to a main controller 78.

The operation of the distributor 60 is now described.

When the start switch 76 is closed, a voltage of 12 V is applied to the control terminal 66C to thereby excite the electromagnetic coil 74R for the auxiliary power supply and the electromagnetic coil 66RP and 66RN for the converter so that the contacts 66P and 66N for the converter and the contact for the auxiliary power supply 74P are closed. Thus, the DC-to-DC converter 66 is operated. Subsequently, when an operation start signal from the main controller 78 is supplied to the control terminal 70C, the electromagnetic coils 70RP and 70RN are excited and the contacts 70P and 70N are closed, so that a charging current flows from the main battery 64 through the contacts 70P and 70N and the resistor 70Pr to the capacitor 70. Then, when an operation start signal from the main controller 78 is supplied to the control terminal 62C, the electromagnetic coil 62R is excited and the contacts 62P and 62N are closed. Thus, electric power of the main battery 64 is supplied through the contacts 62P and 62N to the driving circuit 62D. Further, when an operation start signal from the main controller 78 is supplied to the control contact 68C, the electromagnetic coil 68RP and 68RN are excited and the contacts 68P and 68N are closed. Thus, electric power of the main battery 64 is supplied through the contacts 68P and 68N to the driving circuit 68D.

When the charger 72 is connected to the input terminals 72IP and 72IN while the start switch 76 is opened, the charger 72 produces a connection signal to supply it to the main controller 78, so that the main controller 78 supplies an operation start signal to the control terminal 72C to excite the electromagnetic coil 74R for the auxiliary power supply and the electromagnetic coils 66RP and 66RN for the converter so that the contacts 66P and 66N for the converter and the contact 74P for the auxiliary power supply are closed to thereby operate the DC-to-DC converter 66.

However, the conventional distributor 60 has the following problems.

(1) Recently, many functions are added to the distributor 60, so that the number of switch means and switch actuating means such as contacts and electromagnetic coils has increased considerably. Accordingly, a structure of the distributor has become complicated and large, and its manufacturing costs have also increased.

(2) When a current suddenly flows from the main battery 64 through the contacts 62P and 62N to the capacitor 70, the contacts 62P and 62N are damaged. Accordingly, the capacitor 70 is charged beforehand through the contacts 70P and 70N and the resistor 70Pr. However, even if the contacts 62P and 62N are opened to separate the driving circuit 62D from the main battery 64, the capacitor 70 is left charged and accordingly there is the possibility that the driving circuit 62D begins undesired operation by the charged voltage in the capacitor. Further, when the electric automobile is repaired, the worker is required to pay attention to the charged voltage remaining in the capacitor 70 and accordingly the repair work has been unnecessarily complicated.

(3) Even when the charger 72 is not connected to the input terminals 72IP and 72IN, the output voltage of the main battery 62 is always applied to the input terminals 72IP and 72IN.

SUMMARY OF THE INVENTION

It is a first object of the present invention to provide a distributor in which the number of switch means and switch actuating means is reduced without a sacrificing the functions of the distributor in order to simplify and make the structure of the distributor small. It is a second object of the present invention to provide a distributor which prevents undesired operation of a driving circuit caused by the charge stored in the capacitor in the driving circuit for the drive motor. It is a third object of the present invention to provide a distributor in which the output voltage of the main battery is not applied to input terminals for charging the main battery when the charger is not connected to these input terminals.

According to a first aspect of the present invention, there is provided the distributor comprising switch means for cutting off or connecting a driving circuit of an air conditioner and a DC-to-DC converter from or to a main battery, switch actuating means for opening and closing the switch means, and a control terminal for controlling the switch actuating means.

An example of operation of the distributor is now described. When an operation start signal is applied to the control terminal, the switch means is closed by the switch actuating means, so that the driving circuit of the air conditioner and the DC-to-DC converter are connected to the main battery, and the supply of electric power from the main battery to the driving circuit and the DC-to-DC converter begins. Further, when an operation stop signal is applied to the control terminal, the switch actuating means opens the switch means, so that the driving circuit of the air conditioner and the DC-to-DC converter are cut off from the main battery, and the supply of electric power from the main battery to the driving circuit and the DC-to-DC converter is stopped. Accordingly, the switch means and switch actuating means which are heretofore provided for the driving circuit of the air conditioner become unnecessary.

According to the distributor of the first aspect of the present invention, since the converter switch means cuts off or connects not only the DC-to-DC converter but also the driving circuit of the air conditioner from or to the main battery, switch means and switch actuating means which have been provided for the driving circuit of the air conditioner are no longer required. Accordingly, the number of switch means and switch actuating means can be reduced while maintaining the conventional functions in order to attain simplicity, compactness and low costs.

According to a second aspect of the present invention, there is provided the distributor of an electric automobile comprising converter switch means for cutting off a DC-to-DC converter from a main battery and connecting the DC-to-DC converter to the main battery through a resistor, switch actuating means for the converter for opening and closing the converter switch means, a converter control terminal for controlling the switch actuating means for the converter, pre-charge switch means which shares a portion of the converter switch means and which is for cutting off a driving circuit of a drive motor from the main battery and connecting the driving circuit to the main battery through a resistor, pre-charge switch actuating means for opening and closing the pre-charge switch means, and a pre-charge control terminal for controlling the pre-charge switch actuating means.

According to the second aspect of the present invention, the pre-charge switch means and the converter switch means share one common portion, such as at least one contact point or conductive portion for electric connection and disconnection, so that the switch means can be simplified and accordingly the switch actuating means for opening and closing the switch means can be also simplified. The switch means and the switch actuating means can be simplified while maintaining the conventional functions to thereby be able to attain compactness and low manufacturing cost.

An example of operation of the distributor is now described. When an operation start signal is applied to the converter control terminal, the converter switch actuating means closes the converter switch means, so that the DC-to-DC converter is connected to the main battery and supply of electric power from the main battery to the DC-to-DC converter begins. When an operation stop signal is applied to the converter control terminal, an operation which is reverse of the above can be done. When an operation start signal is applied to the pre-charge control terminal, the pre-charge switch actuating means closes the pre-charge switch means, so that the driving circuit of the drive motor is connected to the main battery through the resistor and a charging current flows into a capacitor of the driving circuit. When an operation stop signal is applied to the pre-charge control terminal, an operation which is reversal of the above operation is carried out. Further, since the pre-charge switch means and the converter switch means share one common portion, the switch means is simplified correspondingly.

According to a third aspect of the present invention, there is provided the distributor for an electric automobile comprising pre-charge switch means for cutting off a driving circuit of a drive motor from a main battery and connecting the driving circuit to the main battery through a resistor, pre-charge switch actuating means for opening and closing the pre-charge switch means, a pre-charge control terminal for controlling the pre-charge switch actuating means, discharge switch means provided between the driving circuit and the pre-charge switch means and for connecting power input terminals of the driving circuit with each other through a resistor and for cutting the connection, discharge switch actuating means for opening and closing the discharge switch means, and a discharge control terminal for controlling the discharge switch actuating means.

An example of operation of the distributor is now described. When an operation start signal is applied to the pre-charge control terminal, the pre-charge switch actuating means closes the pre-charge switch means, so that the driving circuit of the drive motor and the main battery are connected to each other through the resistor and a charging current flows from the main battery to the capacitor of the driving circuit. When an operation stop signal is applied to the pre-charge control terminal, the above operation is reversed. When an operation start signal is applied to the control terminal for discharge, the switch actuating means for discharge closes the switch means for discharge, so that terminals of the driving circuit are connected with each other through the resistor and a discharging current flows from the capacitor of the driving circuit to the resistor. When an operation stop signal is applied to the control terminal for discharge, an operation reverse to the above operation occurs.

According to the distributor of the third aspect of the present invention, since the two or more power input terminals of the driving circuit can be connected through the resistor by closing the discharge switch means provided between the driving circuit and the pre-charge switch means, the capacitor in the driving circuit can be discharged. Accordingly, undesired operation of the driving circuit due to the charged voltage remaining in the capacitor can be prevented. Furthermore, when the electric automobile is repaired, it is not necessary for the worker to pay attention to the charged voltage of the capacitor and accordingly the operation becomes easier.

According to a fourth aspect of the present invention, there is provided the distributor of an electric automobile comprising a charge input terminal for connecting a charger, converter switch means for cutting off or connecting the charge input terminal and a DC-to-DC converter from or to a main battery, converter switch actuating means for opening and closing the converter switch means, and a converter control terminal for controlling the converter switch actuating means.

An example of operation of the distributor is now described. When an operation start signal is applied to the converter control terminal, the converter switch actuating means closes the converter switch means. Thus, the charge input terminal and the DC-to-DC converter are connected to the main battery, so that supply of electric power from the main battery to the DC-to-DC converter is started and the main battery is charged by the charger. When an operation stop signal is applied to the converter control terminal, the above operation is reversed. In other words, since the charge input terminal is disconnected from the main battery by applying the operation stop signal to the converter control terminal, the output voltage of the main battery is not applied to the charge input terminal.

According to the distributor of the fourth aspect of the present invention, the charge input terminal can be disconnected from the main battery by means of the converter control terminal, and accordingly when the charger is not connected to the charge input terminal, the output voltage of the main battery is prevented from being applied to the charge input terminal.

The "switch means" in the present invention is, for example, a contact for a contact relay or a conductive portion for a static relay without contacts. The "switch actuating means" is, for example, an electromagnetic coil for a contact relay or a control portion for a static relay.

DETAILED DESCRIPTION OF THE PREFERRED EMBODIMENT

Figure 1:
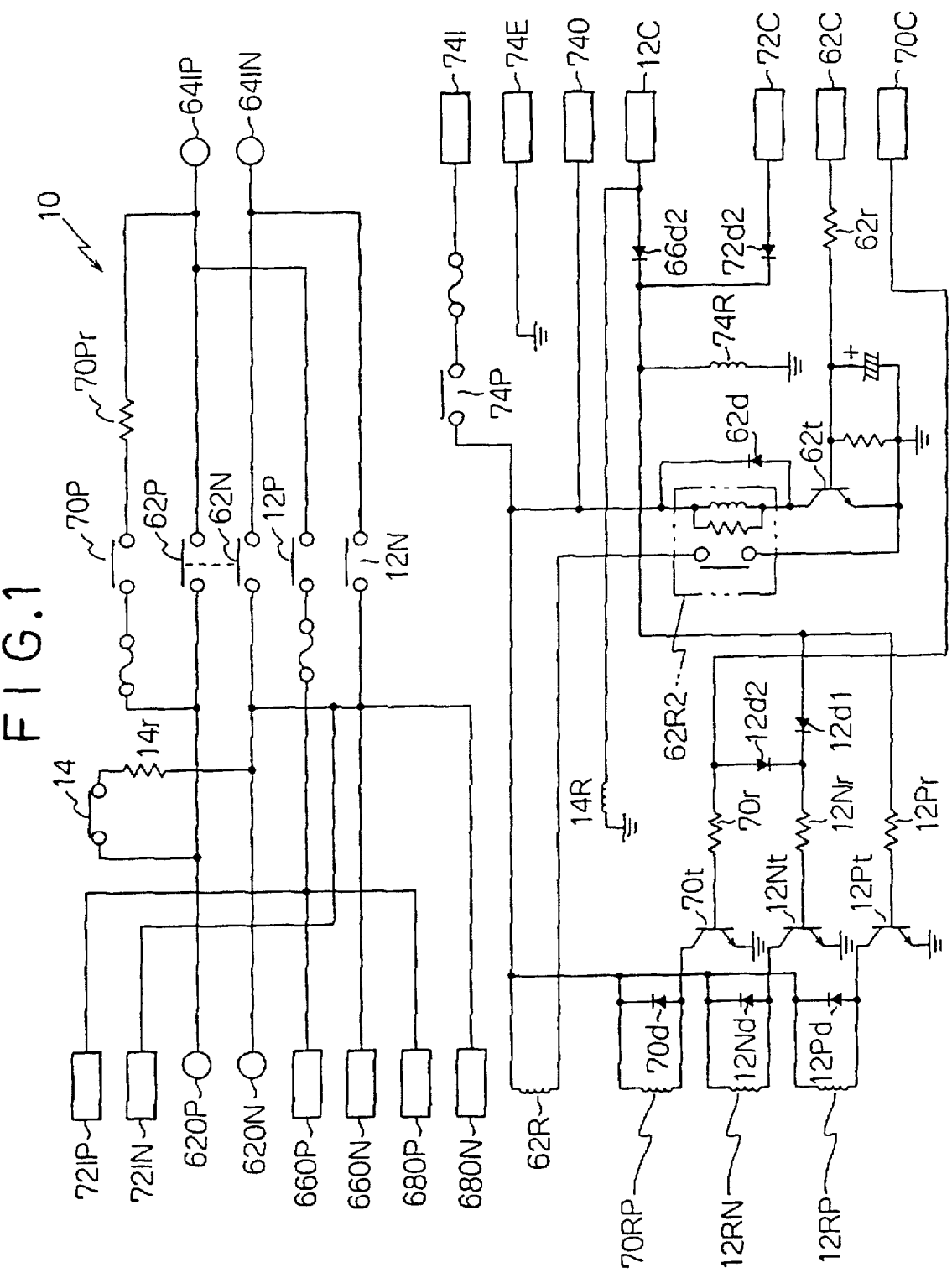
FIG. 1 is a circuit diagram showing an embodiment of a distributor for electric automobiles according to the present invention.
Figure 2:
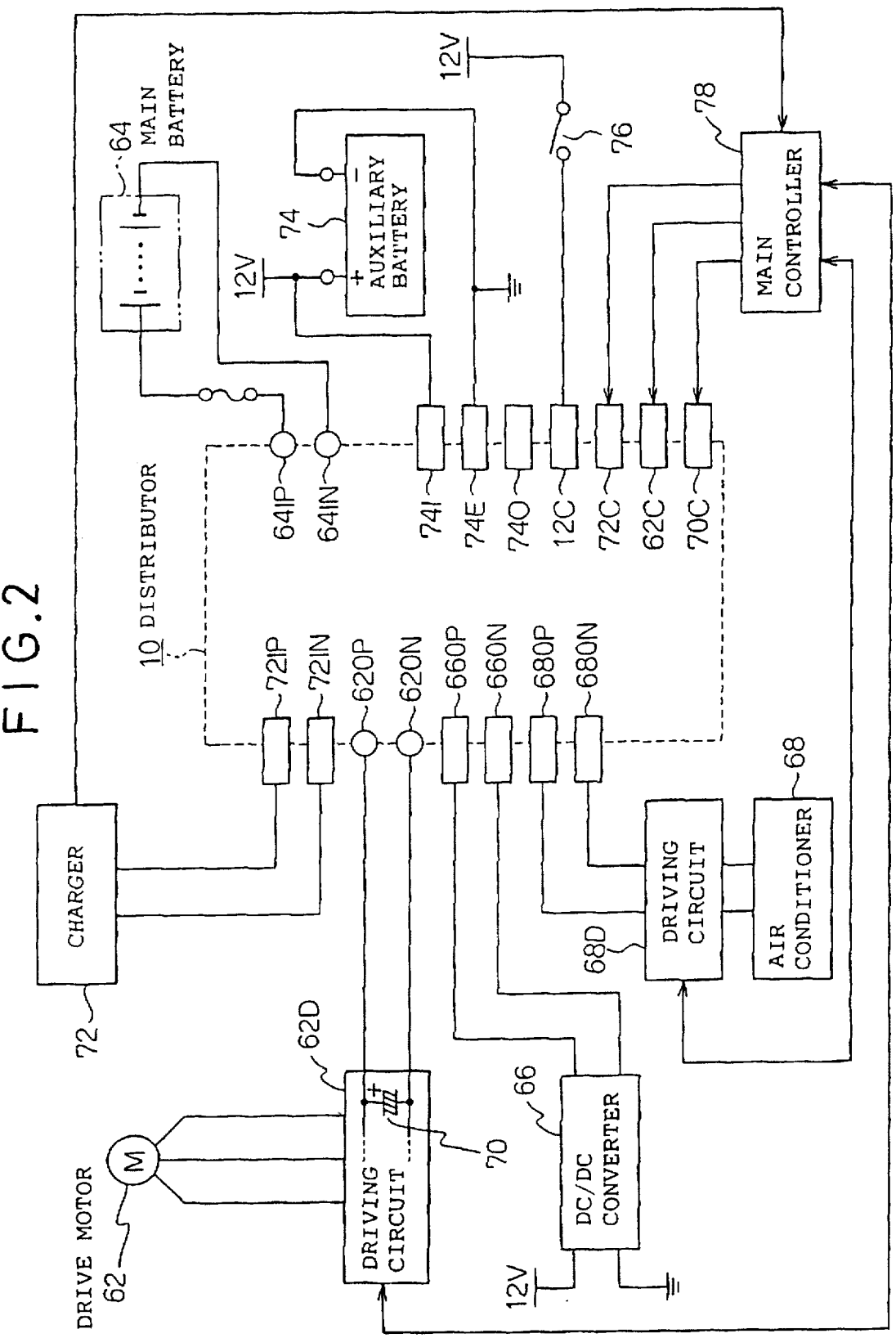
FIG. 2 is a block diagram showing an example of the electric circuitry around the distributor according to the present invention.
Figure 3:
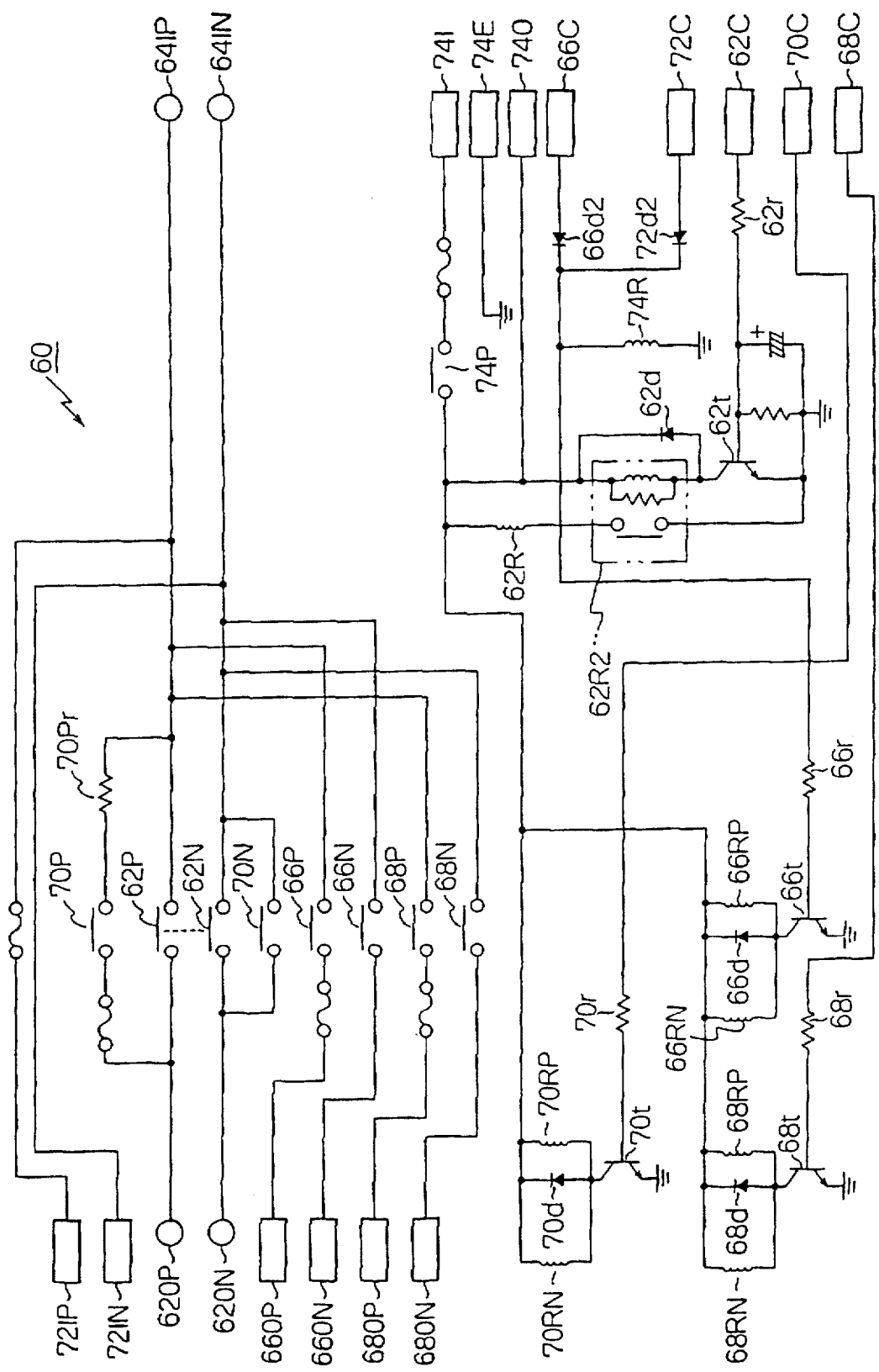
FIG. 3 is a circuit diagram showing a conventional distributor for electric automobiles.
Figure 4:
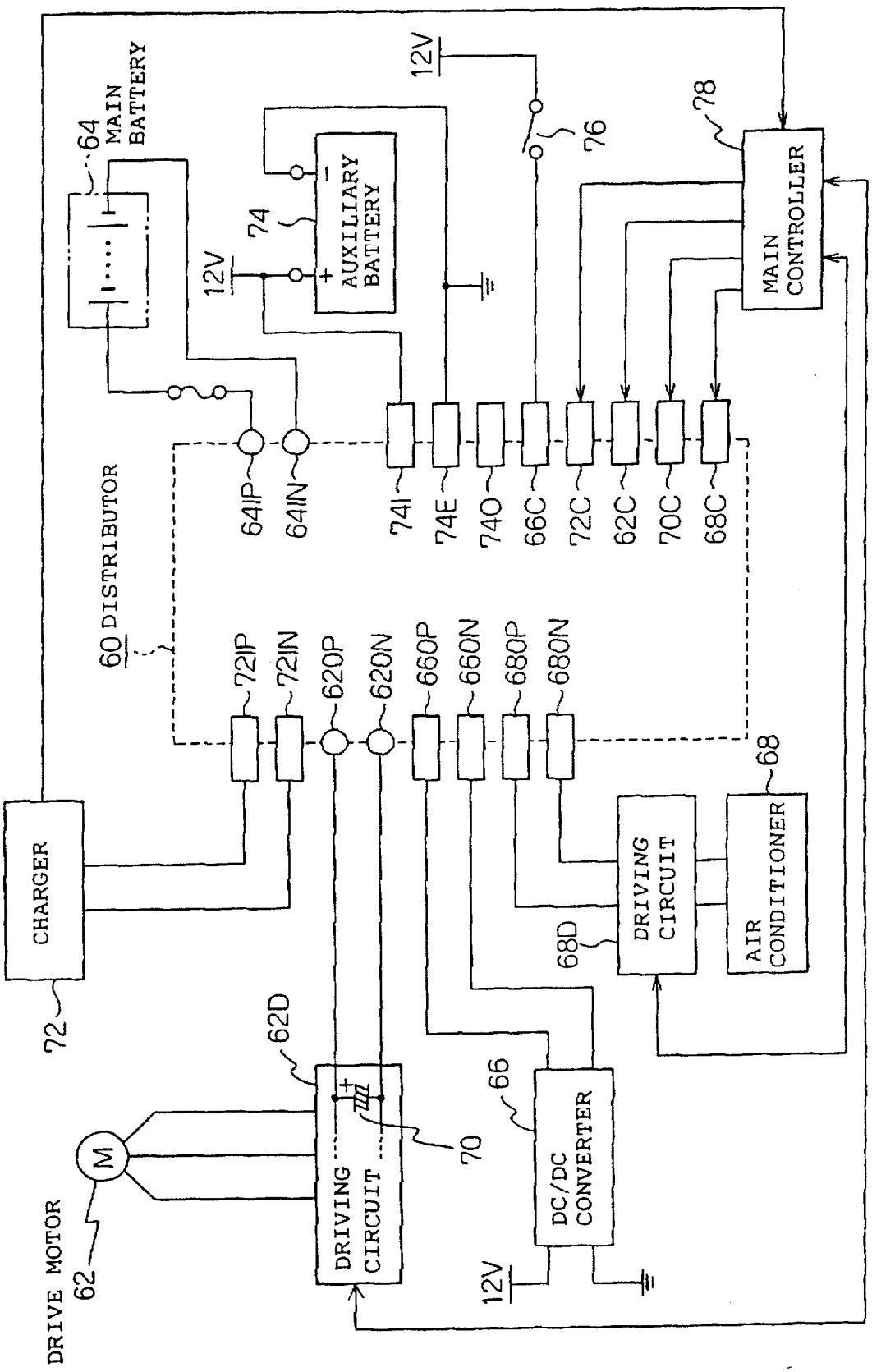
FIG. 4 is a block diagram showing an example of the electric circuitry around the conventional distributor.

FIG. 1 is a circuit diagram showing an embodiment of a distributor according to the present invention. FIG. 2 is a block diagram showing a peripheral electric circuit of the distributor according to the present invention. The distributor is now described with reference to the drawings. The same elements as those in FIGS. 3 and 4 are designated by the same reference numbers and description thereof is omitted.

The distributor 10 according to the present invention includes contacts 12P and 12N for cutting off and connecting a driving circuit 68D of an air conditioner 68, input terminals 72IP and 72IN and a DC-to-DC converter 66 from and with a main battery 64, electromagnetic coils 12RP and 12RN for opening and closing the contacts 12P and 12N, a control terminal 12C used to control the electromagnetic coils 12RP and 12RN, contacts 70P and 12N which are used to cut off a driving circuit 62D of a drive motor 62 from the main battery 64 and connecting the driving circuit 62D through a resistor 70Pr to the main battery 64, electromagnetic coil 70RP and 12RP for opening and closing the contacts 70P and 12N, a control terminal 70C used to control the electromagnetic coil 70RP and 12RN, a contact 14 connected to the electromagnetic coils 70P and 12RN on the side of the driving circuit 62D thereof and for cutting off the two terminals of the driving circuit 62D from each other and connecting the two terminals of the driving circuit 62D with each other through a resistor 14r to each other, an electromagnetic coil 14R for opening and closing the contact 14, and a control terminal 12C used to control the electromagnetic coil 14R.

The contact 12N is shared for connection between the converter and the main battery and for connection for the purpose of pre-charging the main battery, and accordingly the contact 12N is herein called as the "contact 12N for the converter and also for pre-charging." The electromagnetic coil 12RN is used for the converter and also for pre-charging the main battery, and accordingly the electromagnetic coil 12RN is alternatively called as the "electromagnetic coil 12RN for the converter and also for pre-charging." Further, the control terminal 12C is for the converter as well as for the discharging the capacitor in the driving circuit, and according the control terminal 12C is called as "control terminal 12C for the converter and also for discharge."

Connected across the electromagnetic coil 12RN for the converter and also for pre-charging and the electromagnetic coil 12RP for the converter are fly-wheel diodes 12Nd and 12Pd, respectively, and the electromagnetic coils 12RN and 12RP are driven by driving transistors 12Nt and 12Pt, respectively, having the bases connected to base resistors 12Nr and 12Pr, respectively. In order to control the electromagnetic coil 12RN for the converter and also for pre-charging, and the electromagnetic coil 12RP for the converter through the control terminal 12C for the converter and also for discharging, and also in order to control the electromagnetic coil 70RP for pre-charging and the electromagnetic coil 12RN for the converter and also for pre-charging through the pre-charge control terminal 70C, diodes 12dl and 12d2 are connected to the control terminals 12C and 70C, respectively.

The operation of the distributor 10 is now described.

In the initial state, the contacts 62P and 62N for the motor, the contact 12P for the converter, the contact 12N for the converter and pre-charge, and the contact 70P for pre-charging are open. Accordingly, the input terminals 72IP and 72IN for charging the main battery, the driving circuit 62D for the drive motor 62, the DC-to-DC converter 66, and the driving circuit 68D for the air conditioner 68 are cut off or separated from the main battery 64. Hence, the output voltage of the main battery 64 is not applied to the input terminal 72IP and 72IN. On the other hand, since the dischage contact 14 which is a normally closed contact, a charged voltage in the capacitor 70 is discharged through the contact 14, and the driving circuit 62D is not operated by the power remaining in the capacitor 70. Further, since the discharge contact 14 is a normally closed contact, electric power is not required for discharging the capacitor 70.

When the start switch 76 is closed, a voltage of 12 V is applied to the control terminal 12C for the converter to thereby excite the electromagnetic coil 74R for the auxiliary power supply, the electromagnetic coil 14R for discharging the capacitor 70, the electromagnetic coil 12RN for the converter and pre-charging, and the electromagnetic coil 12RP for the converter, so that the contact 12P for the converter, the contact 12N for the converter and also for pre-charging, and the contact 74N for the auxiliary power supply are closed, and the discharge contact 14 is opened. Consequently, the DC-to-DC converter 66 and the driving circuit 68D for the air conditioner 68 are supplied with the voltage from the main battery 64. The driving circuit 68D is operated in accordance with a control signal from the main controller 78. Subsequently, when the main controller 78 issues an operation start signal to the control terminal 70C for pre-charging, the electromagnetic coil 70RP for pre-charging is excited and the pre-charge contact 70P is closed. Thus, a charging current flows from the main battery 64 through the contact 70P for pre-charging, the contact 12 for the converter and also for pre-charging, and the resistor 70Pr to the capacitor 70. Then, when the main controller 78 issues an operation start signal to the control terminal 62C for the motor, the electromagnetic coil 62R is excited to thereby close the contacts 62P and 62N. Consequently, the driving circuit 62D is supplied with the voltage from the main battery 64 through the contacts 62P and 62N.

When the charger 72 is connected to the input terminals 72IP and 72IN for charging the battery while the start switch 76 is opened, a connection signal is issued from the charger 72 to the main controller 78. Then, an operation start signal is issued from the main controller 78 to the control terminal 72C for charging so that the electromagnetic coil 74R for the auxiliary power supply, the electromagnetic coil 14R for discharging the capacitor 70, the electromagnetic coil 12P for the converter and also for pre-charging, and the electromagnetic coil 12RP for the converter are excited to thereby close the contacts 12P, 12N, and 74, and open the discharge contact 14. Consequently, the input terminals 72IP and 72IN for the charging are connected to the main battery 64, and the main battery 64 is charged by the charger 72.

It is needless to say that the present invention is not limited to the above embodiment. For example, instead of the provision of the output terminals 66OP and 66ON for the converter, the DC-to-DC converter 66 and the like may be directly connected to the converter contact 12P and the contact 12N for converters and pre-charge and the like.

I claim:

1. A distributor for an electric automobile comprising converter switch means for cutting off or connecting a DC-to-DC converter from or to a main battery, converter switch actuating means for opening and closing said switch means, a converter control terminal for controlling said converter switch actuating means, pre-charge switch means which shares a portion of said converter switch means for cutting off a driving circuit of a drive motor from said main battery or for connecting said driving circuit to said main battery through a resistor, pre-charge switch actuating means for opening and closing said pre-charge switch means, and a pre-charge control terminal for controlling said pre-charge switch actuating means.

2. A distributor of an electric automobile comprising pre-charge switch means for cutting off a driving circuit of a drive motor from a main battery or connecting said driving circuit to said main battery through a resistor, pre-charge switch actuating means for opening and closing said pre-charge switch means, a pre-charge control terminal for controlling said pre-charge switch actuating means, discharge switch means provided between said driving circuit and said pre-charge switch means for connecting terminals of said driving circuit with each other through a resistor and for cutting off the connection between two terminals of the driving circuit, discharge switch actuating means for opening and closing said discharge switch means, and a discharge control terminal for controlling said discharge switch actuating means.

3. A distributor of an electric automobile comprising a charging input terminal for connecting a charger, converter switch means for cutting off or connecting said charging input terminal and a DC-to-DC converter from or to a main battery, converter switch actuating means for opening and closing said converter switch means, and a converter control terminal for controlling said converter switch actuating means.

* * * * *

UNITED STATES PATENT AND TRADEMARK OFFICE
CERTIFICATE OF CORRECTION

PATENT NO.  : 5,767,587
DATED       : June 16, 1998
INVENTOR(S) : Nishikiori

It is certified that error appears in the above-identified patent and that said Letters Patent is hereby corrected as shown below:

On the title page, item [75], Inventor: "Hamamatsu" should be --Shizuoka-ken--.
Item [30]
Foreign Application Priority Data, "May 12, 1995" should be --December 5, 1995--.

Signed and Sealed this

Sixth Day of October, 1998

Attest:

BRUCE LEHMAN

*Attesting Officer*     *Commissioner of Patents and Trademarks*